Figure 1:
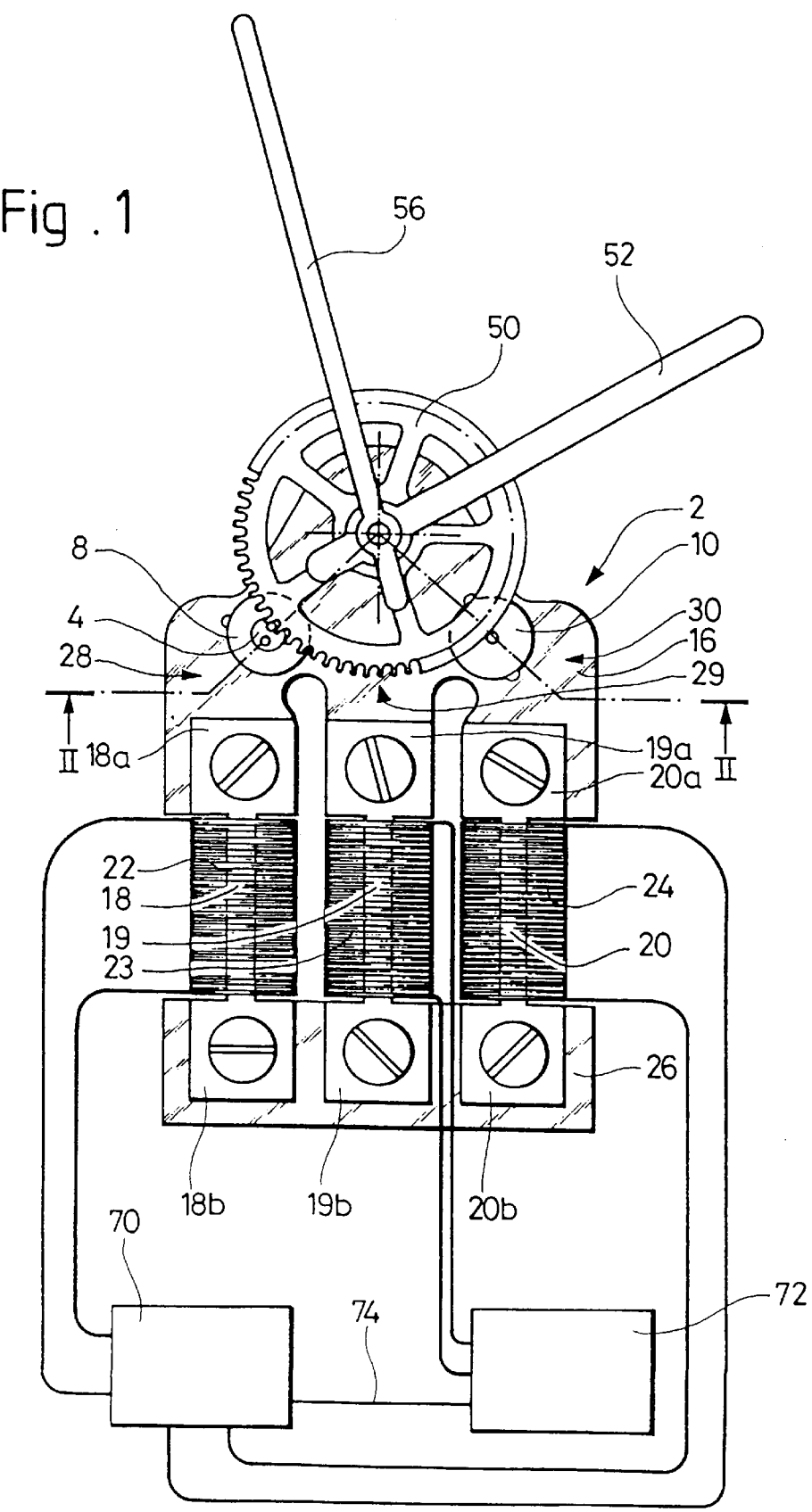

United States Patent
Guérin

[19]
[11] Patent Number: 6,025,660
[45] Date of Patent: *Feb. 15, 2000

[54] ELECTROMECHANICAL TRANSDUCER COMPRISING TWO ROTORS HAVING PERMANENT MAGNETS

[75] Inventor: Yves Guérin, Saint-Louis, France

[73] Assignee: Eta SA Fabriques d'Ebauches, Grenchen, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/910,904

[22] Filed: Aug. 13, 1997

[30] Foreign Application Priority Data

Aug. 14, 1996 [FR] France ................... 96 10201

[51] Int. Cl.⁷ .......... H02K 37/14; H02K 37/24; H02K 11/00; H02K 16/00
[52] U.S. Cl. .......... 310/49 R; 310/114; 310/68 B; 310/254
[58] Field of Search .......... 310/49 R, 40 MM, 310/112, 114, 162, 164, 254, 68 B; 318/696, 685; 368/157, 160, 161, 162

[56] References Cited

U.S. PATENT DOCUMENTS

| | | | |
|---|---|---|---|
| 4,095,177 | 6/1978 | Harris | 310/171 |
| 4,144,467 | 3/1979 | Nakajima et al. | 310/49 R |
| 4,449,086 | 5/1984 | Hoffman et al. | 318/696 |
| 4,477,759 | 10/1984 | Guerin et al. | 318/696 |
| 4,563,604 | 1/1986 | Xuan | 310/49 R |
| 4,633,156 | 12/1986 | Besson et al. | 318/696 |
| 5,172,349 | 12/1992 | Triponez et al. | 368/157 |
| 5,283,492 | 2/1994 | Mason | 310/114 |
| 5,289,452 | 2/1994 | Sakamoto et al. | 368/73 |
| 5,400,303 | 3/1995 | Tu et al. | 368/157 |
| 5,579,290 | 11/1996 | Zafferri et al. | 310/40 MM |
| 5,684,351 | 11/1997 | Elferich | 310/114 |
| 5,734,215 | 3/1998 | Taghezout et al. | 310/114 |

FOREIGN PATENT DOCUMENTS 0 698 957 2/1996 European Pat. Off. .

*Primary Examiner*—Clayton LaBelle
*Attorney, Agent, or Firm*—Griffin, Butler, Whisenhunt & Szipl, LLP

[57] ABSTRACT

Transducer, in particular clockwork driving motor, comprising a stator (2) formed of two stator parts (16 and 26) and three cores (18, 19, 20) connecting respectively three magnetic poles (28, 29, 30), defined by the first stator part (16), to the second stator part (26) used to close the magnetic paths of the transducer. The coils (22 and 24) are used to supply the transducer to drive in rotation respectively the two rotors (4 and 6). The coil (23) is connected to detection means (72) used for detecting the rotation of one or other of the two rotors (4 and 6), and in particular, for detecting zero crossing of the induced voltage (or similarly of the induced current) in the coil (23). Detection of zero crossing of the induced voltage is used to provide input signals to the supply means (70) to control driving of the rotors (4 and 6) in an efficient and reliable manner, in particular in a rapid or continuous operating mode, whether in a forward or backward rotational direction.

21 Claims, 8 Drawing Sheets

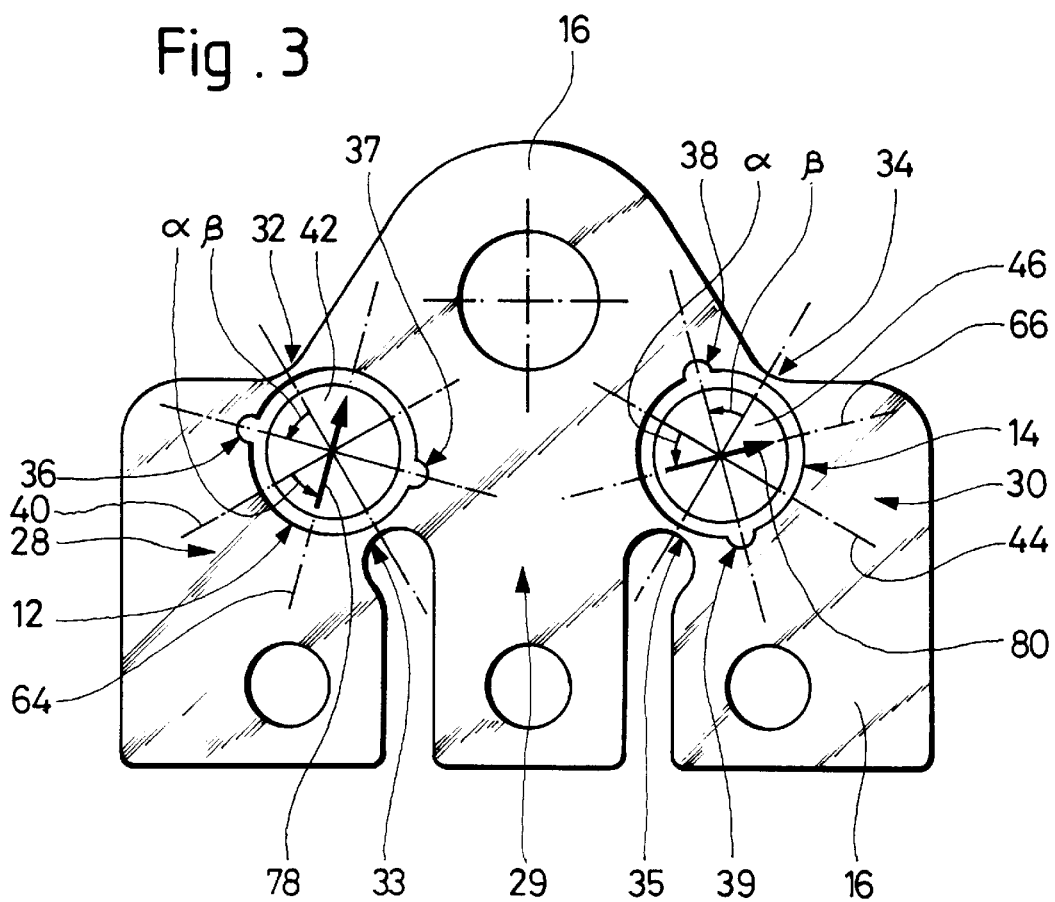

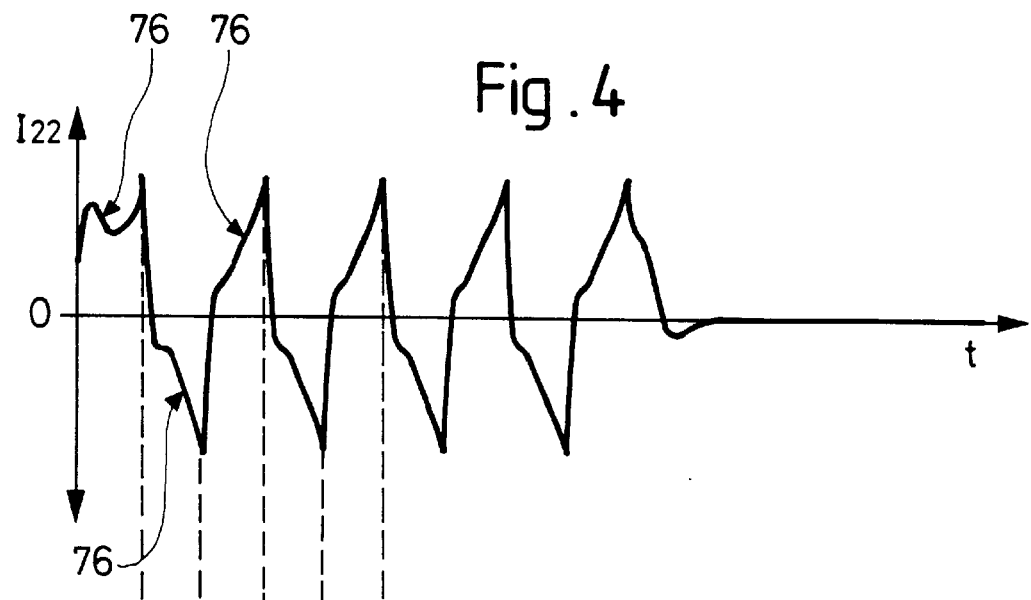
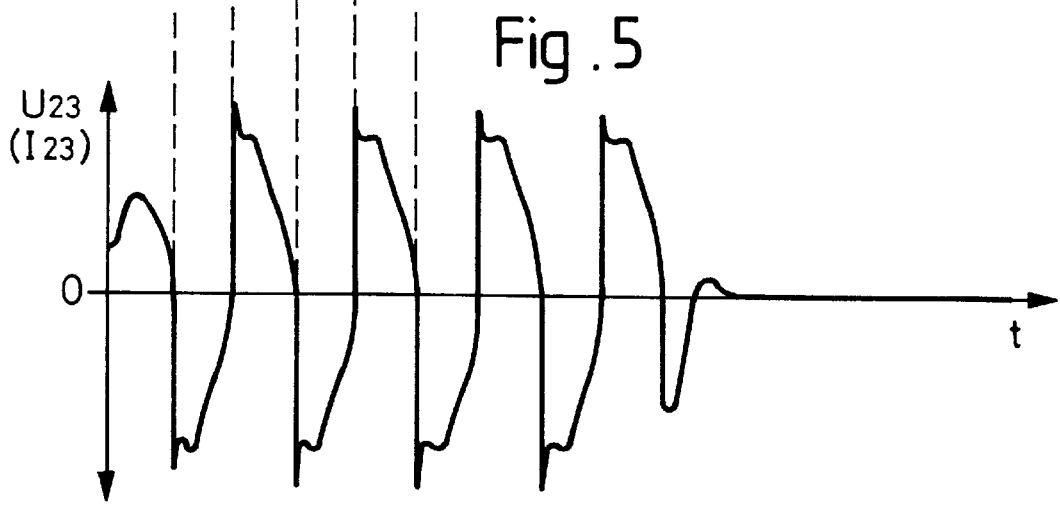
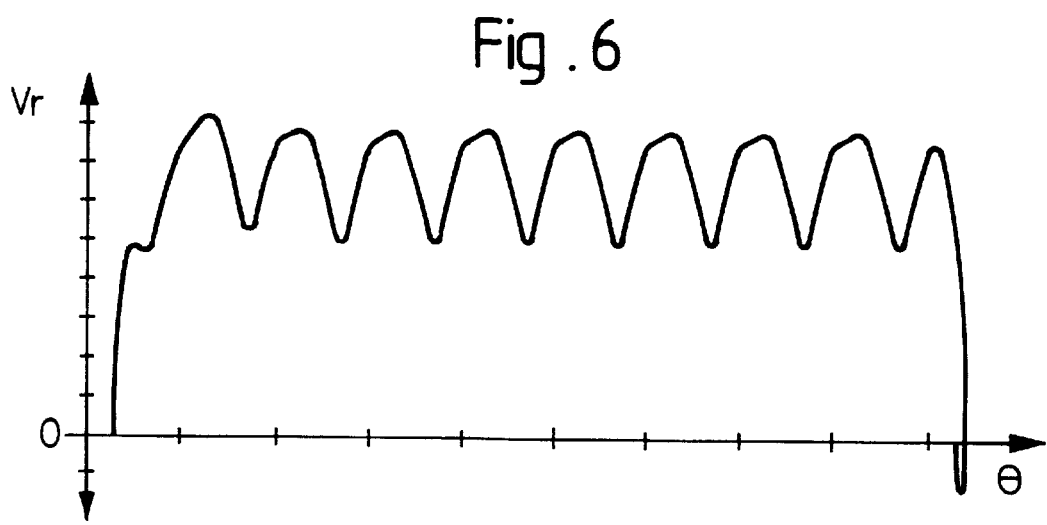

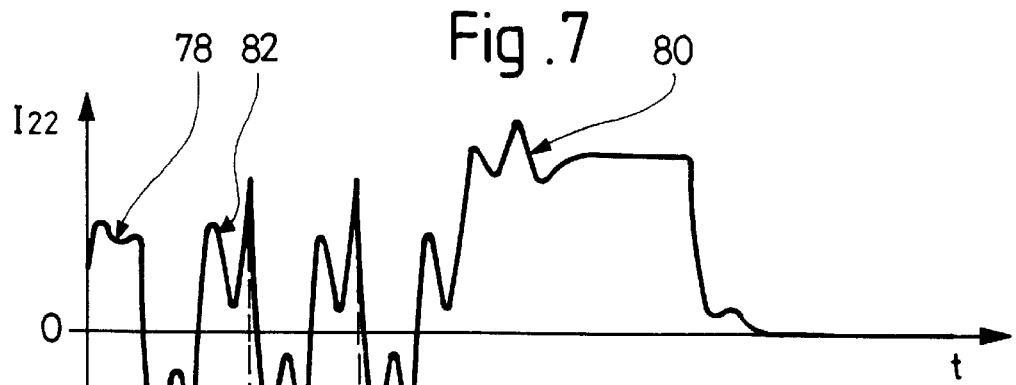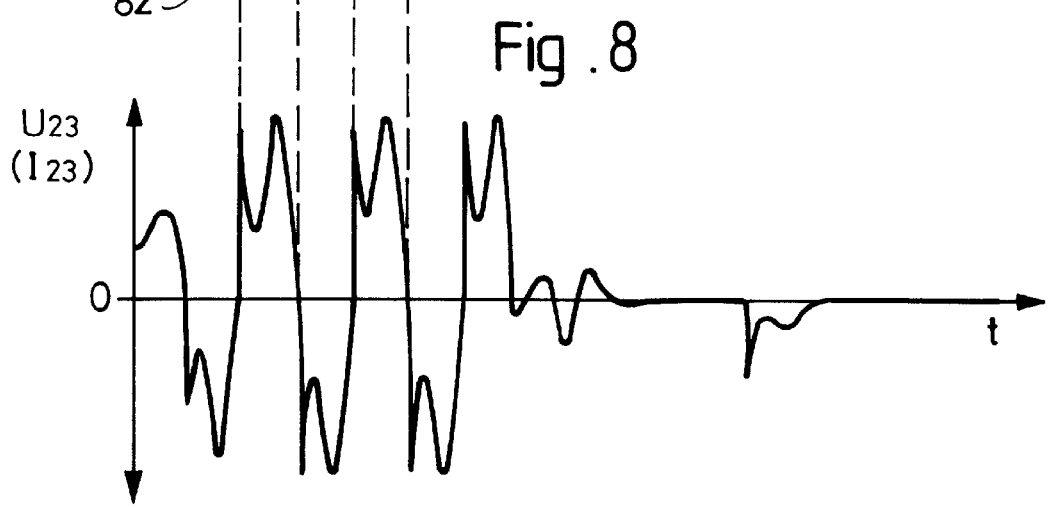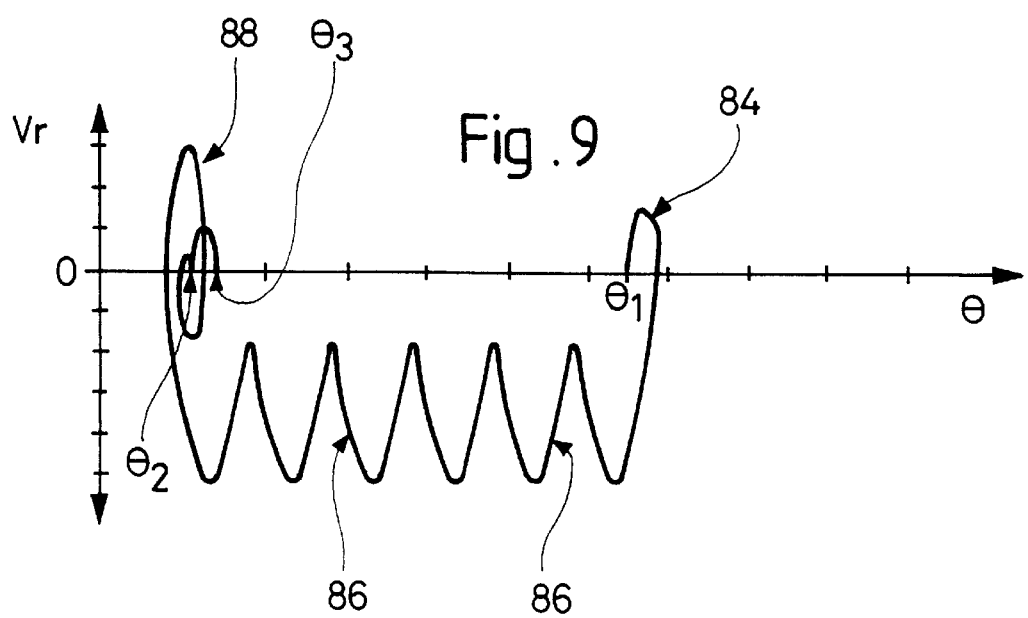

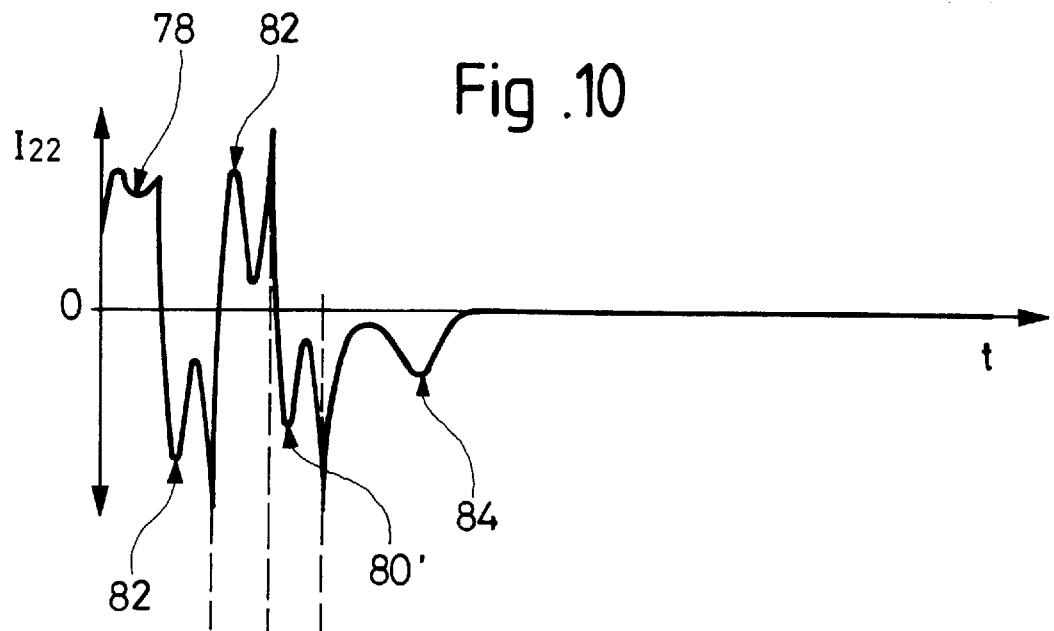
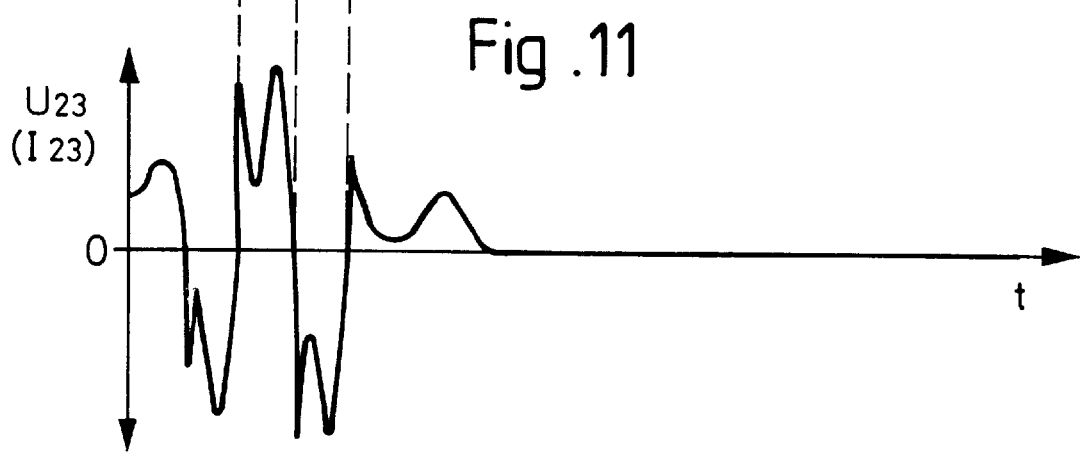
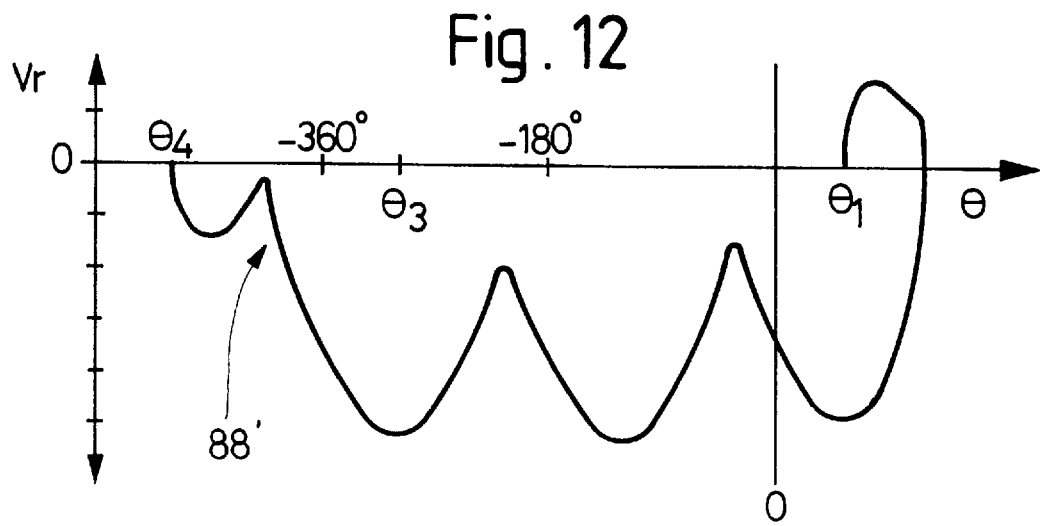

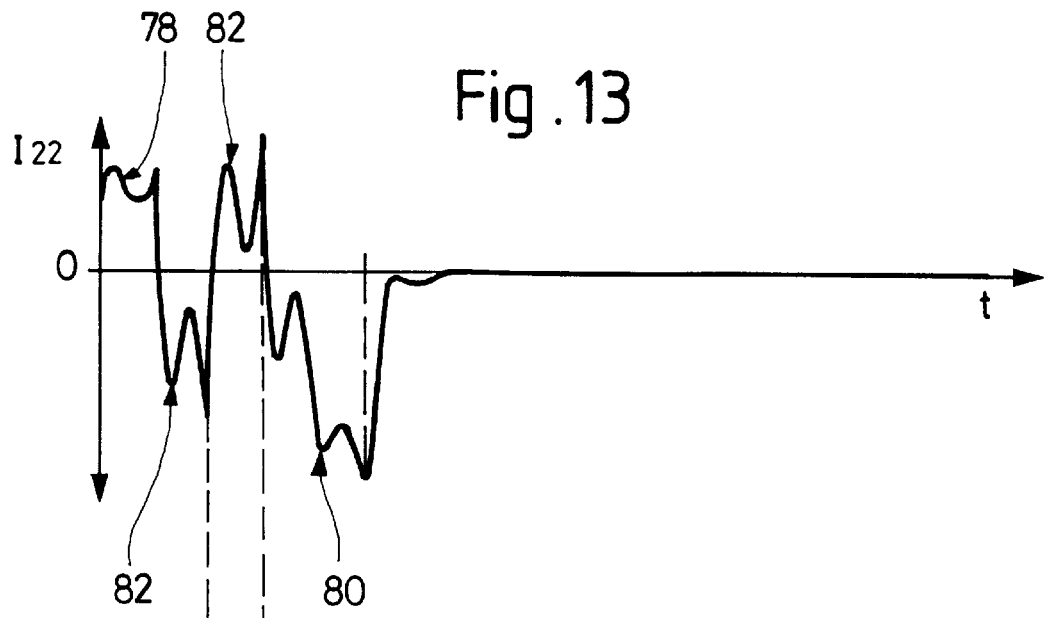
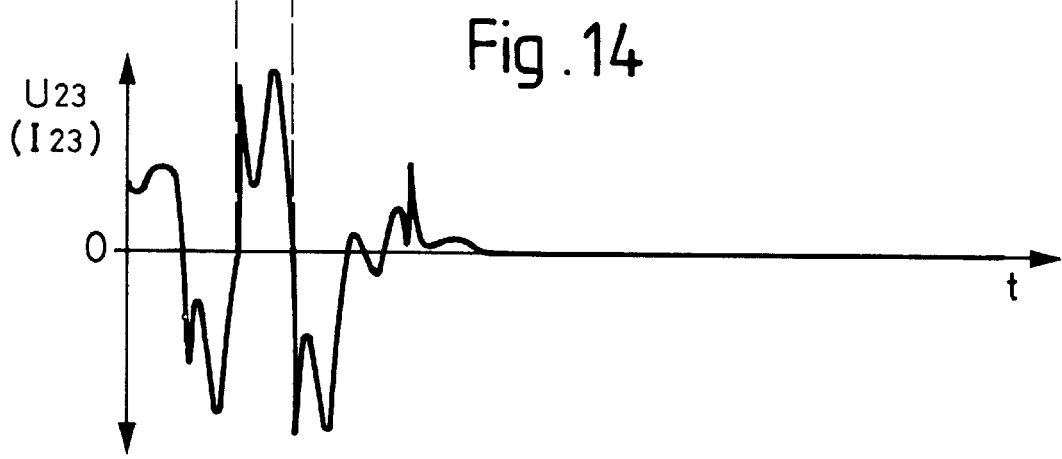
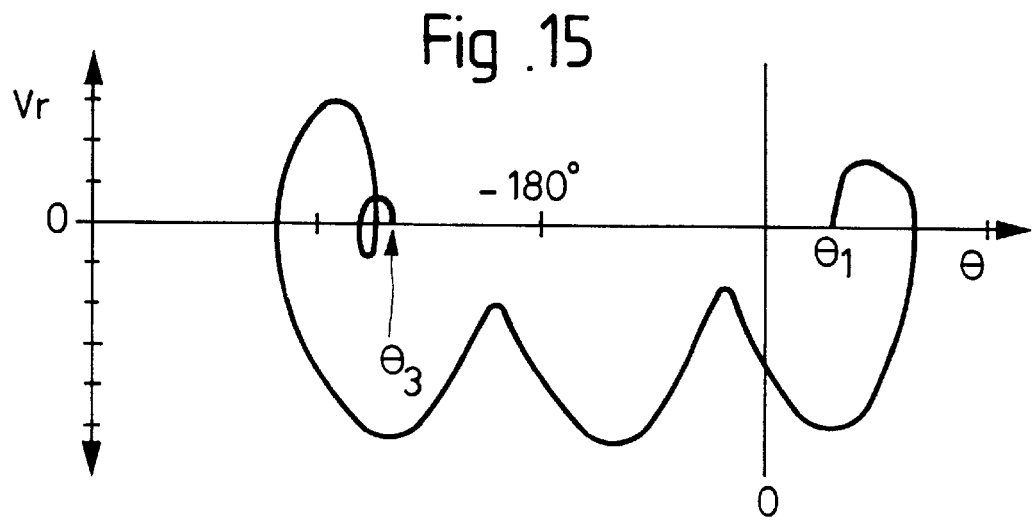

ELECTROMECHANICAL TRANSDUCER COMPRISING TWO ROTORS HAVING PERMANENT MAGNETS

The present invention concerns an electromechanical transducer comprising two rotors having permanent magnets. In particular, the present invention concerns a motor assembly comprising two permanent magnet rotors, this motor assembly having a plane structure. The motor assembly according to the invention may in particular be used in watch and clockwork applications.

An object of the present invention is to provide an electromechanical transducer comprising in a same structure two permanent magnet rotors able to be controlled independently of each other, either in a stepping operating mode or in an accelerated or continuous operating mode.

A particular aim of the present invention is to provide an electromechanical transducer of this type which has a high level of reliability during operation of one or other of the two rotors in an accelerated or continuous mode.

Another object of the present invention is to provide an electromechanical transducer of the aforementioned type wherein each of the two rotors may rotate reliably in both of its rotational directions.

By operating reliability, it is understood in particular that the selectively controlled rotor effects the number of steps or the number of revolutions determined by the control circuit, in a predetermined direction.

The present invention therefore concerns an electromechanical transducer comprising a stator and first and second rotors comprising respectively first and second bipolar permanent magnets having radial magnetisation, the stator defining first and second stator holes within which are respectively situated the first and second permanent magnets. This stator comprises a first part defining first, second and third magnetic poles, said first and second magnetic poles entirely defining the first stator hole and said second and third magnetic poles entirely defining the second stator hole. The first, second and third magnetic poles are respectively connected to the first ends of first, second and third magnetic cores respectively bearing first, second and third coils, the second ends of these first, second and third magnetic cores being connected to a second part of the stator used for closing the magnetic circuits of this electromechanical transducer.

According to a first embodiment, the first and third coils are connected to supply means arranged to supply these first and third coils so as to drive in rotation respectively the first and second rotors. The second coil is connected to means for detecting the rotation of said first rotor or of said second rotor. In a preferred alternative embodiment, the detection means are arranged for detecting zero crossings of the induced voltage in the second coil when said first and second rotors are selectively actuated in a rapid or continuous operating mode by the supply means arranged for this purpose, the detection means being electrically connected to the supply means to which they are capable of supplying an input signal when the induced voltage in the second coils crosses zero. The supply means are arranged to be able to reverse the polarity of the supply voltage when they receive one said input signal.

In a second embodiment of the transducer according to the invention, the second coil may selectively be connected to the supply means in order to receive a supply current or to means for detecting the rotation of the first or second selectively actuated rotor.

In a preferred alternative of this second embodiment, the second coil is electrically connected in series or in parallel to the first or the third coil according to whether the first or second rotor is actuated in rotation in a stepping operating mode, and to the aforementioned detection means when a rapid or continuous operating mode is activated.

The present invention will be described in detail hereinafter by means of the following description, made with reference to the attached drawings, given by way of non limiting example, in which:

FIG. 1 is a schematic top view of an electromechanical transducer according to the invention coupled to two independent, coaxial wheels, FIG. 2 is a cross-section along the line II—II of FIGS. 1 and 16;

FIG. 3 is a top view of a first part of the stator of the transducer of FIG. 1, the permanent magnets of the two rotors of the transducer being shown schematically;

FIGS. 4, 5 and 6 show respectively the supply current in a selected supply coil, the induced voltage in a detection coil as a function of time, and the angular rotational speed of the driven rotor as a function of the angle of rotation in a rapid or continuous forward operating mode;

FIGS. 7, 8 and 9 show respectively the supply current in a selected supply coil, the induced voltage in a detection coil as a function of time, and the angular rotational speed of the driven rotor as a function of the angle of rotation in a rapid or continuous backward operating mode;

FIGS. 10, 11 and 12 show respectively the same variables as those of FIGS. 7, 8 and 9 but in a case where a two backward step command in rapid operating mode has resulted in an additional rotational step of the rotor;

FIGS. 13, 14 and 15 respectively show the same variables as those of FIGS. 10, 11 and 12 also for a two backward step command in a rapid operating mode for which the expected number of steps of the rotor are correctly effected, and FIG. 16 is a schematic top view of a second embodiment of an electromechanical transducer according to the invention.

A first embodiment of an electromechanical transducer according to the invention will be described hereinafter with reference to FIGS. 1 to 3. In this embodiment, the transducer operates as a motor.

The transducer comprises a stator 2 and two rotors 4 and 6 respectively housed in two rotor cages 8 and 10 mounted respectively in two stator openings or holes 12 and 14 defined by a first stator part 16.

Stator 2 also comprises three magnetic cores 18, 19 and 20 respectively bearing three coils 22, 23 and 24, and a second stator part 26 used for closing the magnetic circuits or paths of the transducer described here. First stator part 16 defines first, second and third magnetic poles 28, 29 and 30. Magnetic pole 28 is electrically connected to the first end **18*a* of magnetic core 18, while magnetic poles 29 and 30 are respectively connected to first ends 19*a* and 20*a* of magnetic cores 19 and 20. The second ends 18*b*, 19*b* and 20*b* of respective cores 18, 19 and 20 are magnetically connected to second stator part 26**.

First and second magnetic poles 28 and 29 are magnetically insulated from each other by two necks 32 and 33 forming zones of high reluctance, while second and third magnetic poles 29 and 30 are magnetically insulated from each other by two necks 34 and 35 forming zones of high reluctance. Two positioning notches 36 and 37, 38 and 39 respectively are provided on the edge of stator opening 12, and stator opening 14 respectively. The two necks 32 and 33 define a first zero coupling direction between coil 22 and permanent magnet 42 of rotor 4. Likewise, necks 34 and 35 define a second zero coupling direction 44 between coil 24 and permanent magnet 46 of rotor 6.

It will be noted that permanent magnets 42 and 46 are bipolar magnets having radial magnetisation, these magnets being situated respectively within stator holes 12 and 14.

Rotor 4 is coupled to a first wheel 50 attached to a first hand 52 and second rotor 6 is attached to a second wheel 54 coaxial with wheel 50 and attached to a hand 56. It will be noted that wheels 50 and 54 are placed on either side of first stator part 16. Moreover, wheels 50 and 54 are of equal diameters. Wheel 54 is connected to hand 56 via a shaft 58 able to rotate freely within a pipe 60 attached to stator 2. This particular arrangement thus allows independent driving of hands 52 and 56 which are coaxial in rotation.

Notches 36 and 37 define a first minimum energy direction 64 for permanent magnet 42, while notches 38 and 39 define a second minimum energy direction 66 for permanent magnet 46. First zero coupling direction 40 and first zero energy direction 64, respectively second zero coupling direction 44 and second minimum energy direction 66 are staggered at an angle $\alpha$ which is not zero. It will be noted that the angle $\beta$ between the geometrical direction defined by necks 32 and 33, respectively 34 and 35 and the geometrical direction defined by notches 36 and 37, 38 and 39 respectively, has a value substantially equal to that of angle $\alpha$, In the embodiment described here, the value of angle $\alpha$ is slightly less than that of angle $\beta$.

Coils 22 and 24 are connected to supply means 70, coil 23 being connected to means 72 for detecting the rotation of rotor 4 or rotor 6 according to whether one or other of such rotors is actuated. Detection means 72 are electrically connected to supply means 70 to allow the transmission of electric signals between detection means 72 and supply means 70, which is represented in FIG. 1 by electric connection line 74.

The operation of the transducer described hereinbefore and the manner in which the transducer is controlled will now be described in more detail. Four operating modes will essentially be noted. The first operating mode is the stepping mode in the forward rotational direction of one or other of the two rotors 4 and 6. The second operating mode is the stepping mode in the backward rotational direction of one or other of the two rotors 4 and 6. The third operating mode is a rapid or continuous operating mode (also called accelerated operating mode) in the forward rotational direction of one or other of the two rotors 4 and 6. The fourth operating mode is the rapid or continuous operating mode in the backward rotational direction of one or other of rotors 4 and 6.

The forward and backward rotational directions of rotors 4 and 6 are defined by the structure of the transducer described hereinbefore. In the embodiment described here, the forward direction corresponds to a positive rotational direction, i.e. anticlockwise. Consequently, the backward rotational direction is a negative rotational direction, i.e. clockwise.

The structure of the transducer described hereinbefore allows one or other of the two rotors to be moved forward in a stepping mode via a single pulse supplied by the respective supply coil, whereas it is necessary to cause an oscillation of such rotor to drive it in the backward rotational direction, which generally requires supply in the form of three successive pulses as will be described more precisely in the remainder of the present description.

In the forward stepping mode, coil 22 is supplied in a known manner with successive pulses of alternating polarity to drive rotor 4 in rotation. To drive rotor 6 in rotation, coil 24 is supplied in a similar manner.

According to an alternative embodiment, coil 23 and detection means 72 are not used in this operating mode. In another alternative, detection means 72 are designed to analyse an induced voltage signal generated in coil 23 when selectively actuated rotor 4 or 6 rotates. The analysis of the aforementioned induced voltage signal is effected so as to determine the behaviour of the permanent magnet of the actuated rotor at each step to detect whether the rotation has taken place or whether it has probably not taken place. The man skilled in the art knows how to perform such an analysis with detection means associated with the supply coil. In the present case, the analysis is effected on an induced voltage (or induced current) signal generated in an auxiliary coil, namely coil 23. However, the arrangement and the electronic design of detection means 72 for effecting the aforementioned analysis are similar to those which are known to the aforementioned man skilled in the art.

FIGS. 4 to 6 describe schematically the operation of the transducer in a forward rapid or continuous mode. As mentioned hereinbefore, rotor 4 is driven in the forward rotational direction by a sequence of pulses of alternating polarity where each of such pulses drives the rotor in rotation through one step, in the present case through an angle of 180°. Hereinafter, the operation of the transducer in the forward rapid or continuous mode will be described for rotor 4, the driving of rotor 6 in this operating mode being identical but using supply coil 24 in place of supply coil 22.

FIG. 4 shows supply current I22 provided by supply means 70 to coil 22. By supply current, one means the current flowing in the coil resulting from the supply voltage applied to such coil. This supply current has a sequence of pulses 76 of alternating polarity and of substantially similar shape. FIG. 5 shows the induced voltage U23 (or similarly induced current I23) in coil 23 as a function of time. According to the invention, the polarity of the supply voltage is reversed each time that induced voltage U23 (or induced current I23) has the value zero, which results in a polarity reversal of supply current U22. Consequently, one assures that the sequence of pulses 76 of supply current I22 is relatively optimum to assure rapid or continuous operation in a sure and efficient manner. The zero crossing of induced voltage U23 corresponds substantially to an alignment of magnetisation axis 78 of permanent magnet 42 with zero coupling direction 40. As is seen in FIG. 3, such a command allows one to assure that rotor 42 has rotated by more than 90° and that it has passed the geometrical axis defined by notches 36 and 37. Thus, one assures that each pulse drives rotor 4 through one step, i.e. through an angle of 180°. Then, the change in polarity of the supply voltage is effected substantially after magnetisation axis 78 of permanent magnet 42 is aligned with minimum energy direction 64. Consequently, continuous or quasi-continuous rotation of rotor 4 is assured in a reliable and homogenous manner, which also allows the current consumption to be reduced and the yield of the transducer according to the invention to be increased when it operates in rapid or continuous mode.

An identical analysis applies to permanent magnet 46 whose magnetisation axis is represented by the arrow 80.

FIG. 6 shows the angular rotational speed of rotor 4, and thus of permanent magnet 43 which is attached thereto, as a function of the angular position $\theta$ of rotor 4 during rapid or continuous forward rotation. The curve measured by the present inventor shown in FIG. 6 shows that the rotation is effected continuously at a quasi-constant speed, which is advantageous for the purposes of energy saving and rapidity, in particular in the case of driving a watch hand, and for making the product fitted with the motor assembly according to the invention attractive.

In a backward stepping operating mode, the man skilled in the art knows, in the case of a simple monophased motor with one rotor, how to obtain backward rotation via a technique called oscillation requiring supply in the form of three successive pulses. The first supply pulse is used to drive the rotor in the positive direction on an angular path less than 90°. Then, a second supply pulse is provided with a reverse polarity thus allowing driving in the backward rotational direction. Finally, a third supply pulse of identical polarity to the first pulse is supplied to the supply coil so as to assure the performance of a backward step.

In this backward stepping mode, coil 23 connected to detection means 72 may advantageously be able to be used to determine the end of the second pulse and also the beginning of the third pulse. It will be noted that it is advantageous for the purposes of the reliability of backward rotational direction driving that the second pulse is of sufficient duration for the magnetisation axis of the permanent magnet of the selected rotor to pass the aforementioned zero coupling direction and that it is not too long, i.e. the duration of the second pulse is not sufficiently long to allow the magnetisation axis of the permanent magnet of the selected rotor to align itself in a quasi-static manner with the aforementioned zero coupling direction. In order to satisfy these conditions properly, it is proposed, according to the invention, in an alternative embodiment to detect the zero crossing of the induced voltage in coil 23 during the period of time in which the second supply pulse is generated by supply means 70. When the induced voltage in coil 23 crosses zero during the aforementioned period, the supply voltage is reversed, thereby ending the second pulse to generate the aforementioned third pulse. Consequently, stepping rotation in the backward rotational direction of one or other of rotors 4 and 6 is assured.

It will be mentioned that for the purposes of increased reliability, any zero crossing of the induced voltage during a period equal to approximately twice the duration of the first pulse, counted from the beginning of the first pulse, remains without influence on the control of supply of supply coils 22 or 24. The deceleration or acceleration of the permanent magnet of the rotor being driven and in particular the change in rotational direction following the end of the first pulse may generate a zero crossing of the induced voltage in coil 23. Thus, in order to remedy this eventuality, an initial temporal window is provided during which the means for detecting zero crossings are inoperative.

FIGS. 7 to 9 show schematically a backward rapid or continuous operating mode of one or other of the two selectively actuated rotors 4 and 6. Again, for the purposes of simplification, the driving of rotor 4 in this backward rapid or continuous operating mode will be considered, the driving of rotor 6 being similar with supply coil 24 in the place of supply coil 22.

FIG. 7 shows supply current I22 as a function of time and FIG. 8 shows induced voltage U23 (or similarly induced current I23) in coil 23 as a function of time. Current I22 has a sequence of pulses of alternating polarity. First pulse 78 and last pulse 80 are differentiated here from intermediate pulses 82. In a similar manner to the backward stepping operating mode, first pulse 78 is an oscillation pulse driving the rotor in the forward direction. The duration of pulse 78 is fixed and determined so that the forward driving does not result in the rotation of the rotor through one forward step, which would drive the rotor in the forward direction instead of driving it in the desired backward direction.

The man skilled in the art knows this problem and knows how to determine the duration of pulse 78 and also the conditions of its application, in particular with a sampled type pulse, to assure the desired oscillation and the backwards operation of the actuated rotor. Following this first pulse 78, a sequence of pulses 82 of alternating polarity are supplied to supply coil 22. The duration of each of intermediate pulses 82 is determined by the zero crossing of the induced voltage in coil 23, as is shown in FIGS. 7 and 8. The polarity reversal of the supply voltage when the induced voltage in coil 23 crosses zero is provided according to the present invention for the same reasons as those mentioned for the forward rapid or continuous operating mode.

If, in a forward rapid or continuous operating mode such as that previously described, the desired number of steps is obtained correctly and in a sure manner with a last pulse of substantially equivalent length to the preceding pulse, the inventor has noted that this is not the case in the backward rapid or continuous operating mode. This stems from the fact that, in the forward rotational direction, the permanent magnet would have to undergo a rotation greater than 90° following the last pulse in order to effect an additional rotational step, which does not occur, given that it has not yet passed the final minimum energy direction at the end of the last pulse. However, in the backward rotational direction, a last pulse of substantially equivalent duration to that which precedes it may drive the permanent magnet beyond the expected final minimum energy direction, the angle remaining to be travelled to effect an additional step being less than 90°. Thus, last pulse 80 provided by the supply means to the supply coil is greater than the duration of the preceding pulse. This will be explained in more detail hereinafter with reference to FIGS. 10 to 15.

FIG. 9 shows the angular rotational speed Vr of the actuated rotor as a function of the angular position θ of such rotor. It will be recalled that the backward rotational direction corresponds to a negative rotational direction. Thus, in FIG. 9, the actuated rotor starts from angular position θ1. As previously explained, FIG. 9 shows that the rotor rotates firstly in a positive direction over a first part 84 of the curve, then in a negative rotational direction over a second part 86 of this curve. At the end of rotation, corresponding to the last part 88 of the curve shown in FIG. 9, the rotor undergoes oscillation. As is visible in part 88 of the curve of FIG. 9, last pulse 80 is relatively long, the rotor firstly stopping in a first position θ2 corresponding to the zero coupling direction described hereinbefore, then at the end of last pulse 80 the rotor comes to its final position θ3 corresponding to the aforementioned minimum energy direction.

Referring to FIGS. 10 to 15, the problem of the additional final step in the backward rapid or continuous operating mode and the solution proposed by the present invention will be described, as already mentioned hereinbefore.

FIGS. 10 to 12 describe respectively the same variables as FIGS. 7 to 9. For the purposes of simplification, only the two step command in backward rapid mode is described here. As is clear from FIGS. 10 and 11, last pulse 80' is also ended by the zero crossing of induced voltage U23. Thus, the duration of pulse 80' is substantially equal to the duration of pulse 82 which precedes it. It will be noted that induced braking current 84 is of no importance in the present considerations. A supply mode according to FIGS. 10 and 11 leads to the rotation through one unexpected additional step as is seen clearly from the analysis of FIG. 12. Indeed, the end part 88' of the curve shown does not show an oscillation of the rotor returning to the expected final position θ3, but the final position of the rotor is θ4 which corresponds to an additional rotation of 180°.

In order to overcome the aforementioned major drawback, the invention proposes to increase the duration of the last pulse, which leads to a guarantee of the proper behaviour of the rotor which effects exactly the desired number of rotational steps. Again, the variables shown in FIGS. 13 to 15 are respectively identical to those shown in FIGS. 7 to 9. The references already described will not be described again here.

As is shown schematically in FIG. 13, last supply pulse 80 has a duration substantially twice that of pulse 82 which precedes it, the duration of last pulse 80 being fixed in the transducer control circuit included in supply means 70. The analysis of the curve of FIG. 15 resulting from the supply mode according to FIGS. 13 and 14 shows that only two steps of 180° have been effected, the rotor finishing its rotation in desired angular position θ3. It will be noted that, contrary to FIG. 9, the rotor does not make a stop when the magnetisation axis is aligned with the zero coupling direction corresponding to θ2 in FIG. 9.

According to the analysis of results obtained by the inventor, a duration of last pulse 80 equal to 1.5 times the duration of the preceding pulse is sufficient for proper operation of the rotor at the end of rotation. However, for the purpose of certainty, it is proposed, in a preferred alternative embodiment, that the duration of last pulse 80 is at least two times longer than the duration of pulse 82 which precedes it.

Figure 2:
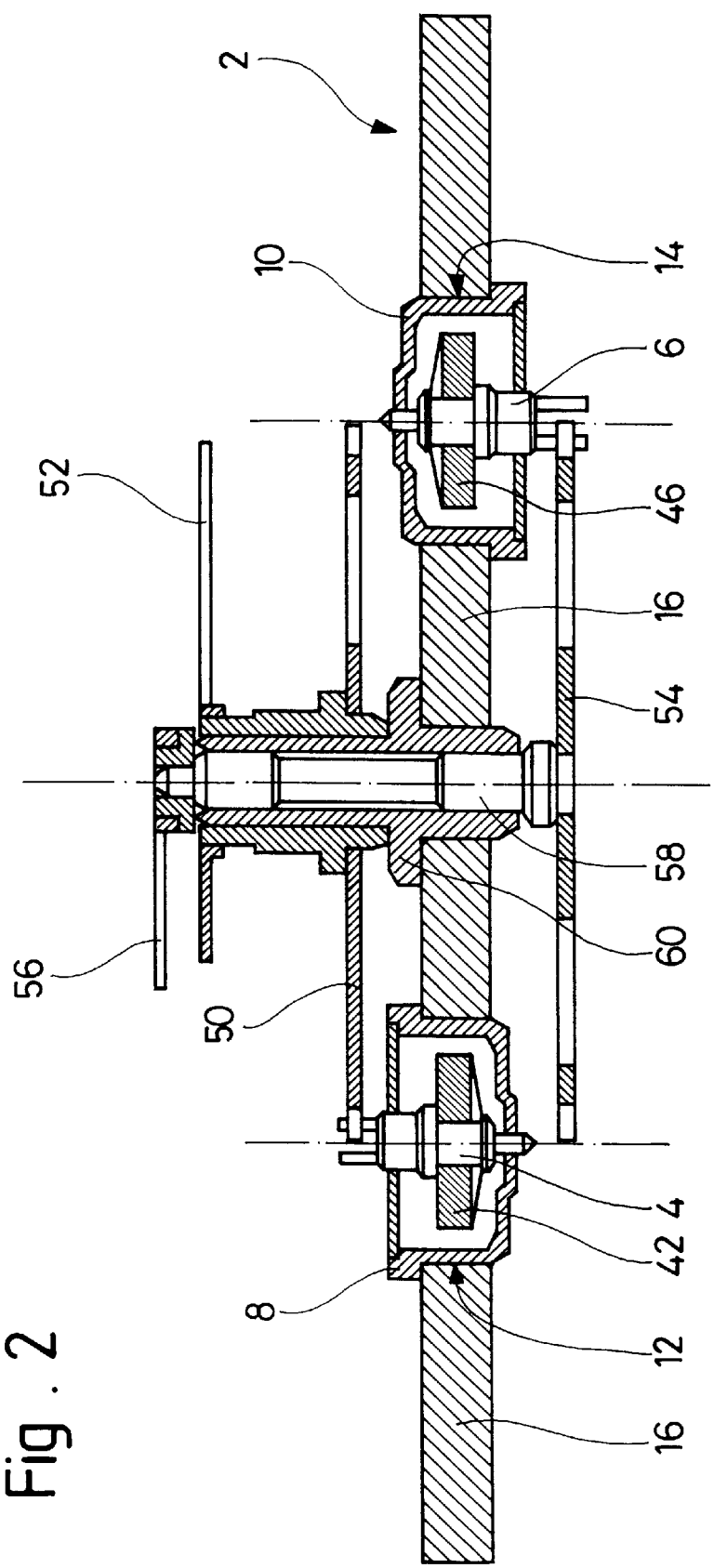
Figure 16:
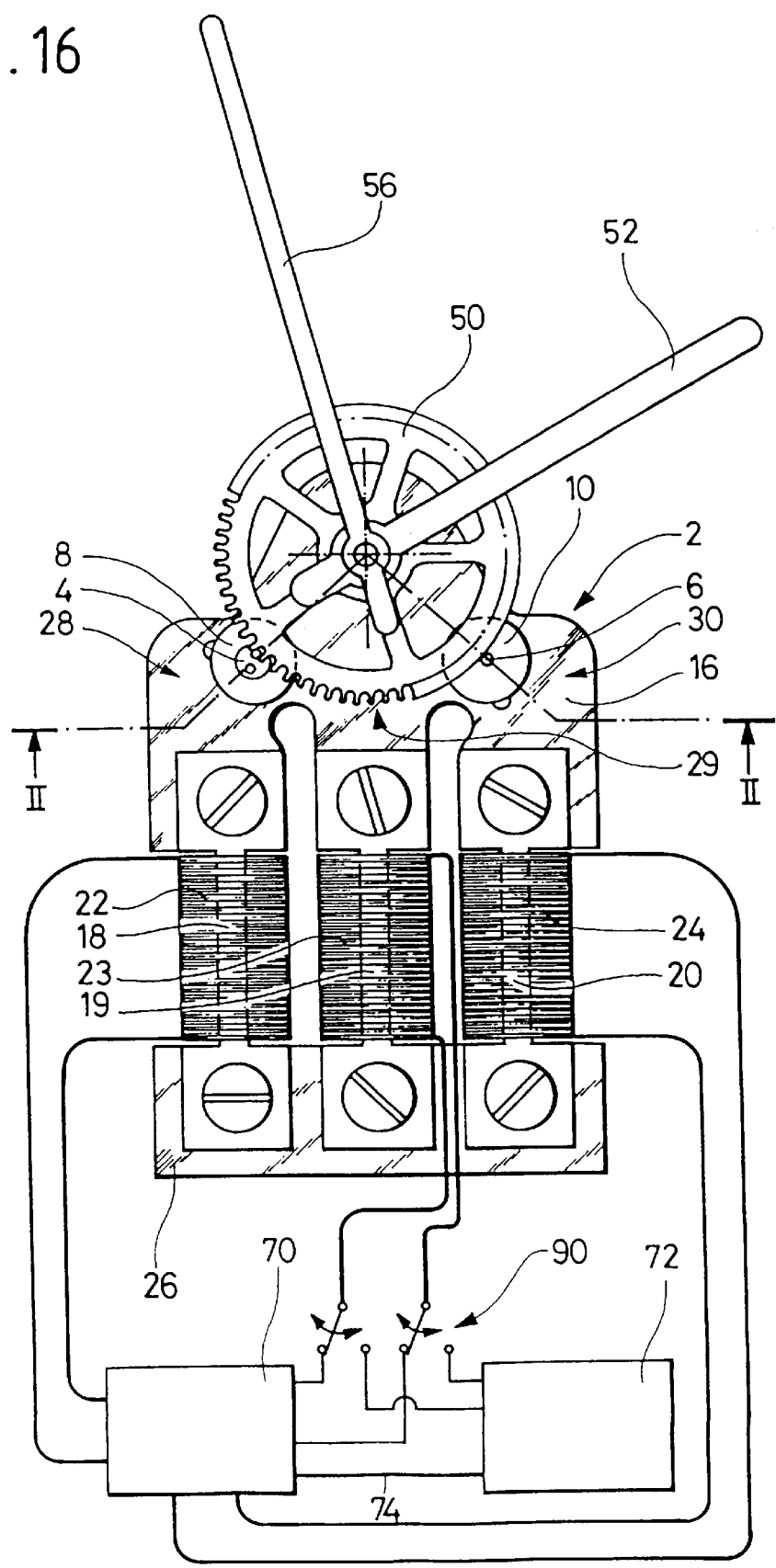

Referring to FIG. 16, a second embodiment of a transducer according to the invention will be described hereinafter. The references already described in relation to FIGS. 1 to 3 will not be described again here in detail. The transducer according to the second embodiment differs from that of the previously described first embodiment in that coil 23, which is associated with magnetic pole 29 common to the two rotors 4 and 6, may be selectively connected either to supply means 70, or to detection means 72 by means of a switch 90 shown schematically in FIG. 16.

In an alternative, it is proposed to connect the second coil to supply means 70 when a forward stepping operating mode is desired. In a first alternative, coil 23 is connected in parallel to supply coil 22 or 24 according to whether rotor 4 or 6 is selectively actuated while the non-supplied supply coil 24 or 22 is short-circuited. In a second alternative, coil 23 is connected in series either to coil 22, or to coil 24 according to whether rotor 4 or 6 is selectively actuated, while the non-supplied supply coil 24 or 22 is short-circuited. Thus, it is possible to use coil 23 as supply means for driving in rotation either rotor 4 or rotor 6.

In a backward rotational direction stepping operating mode, it is possible to connect coil 23 to supply means 70 and, in another alternative, to connect coil 23 to detection means 72 to use coil 23 and these detection means 72 in a similar manner to that described for the first embodiment in a backwards stepping operation mode.

In a rapid or continuous operating mode, coil 23 is connected to detection means 72 and plays an equivalent role to that described in the first embodiment for the forward or backward rapid or continuous operating mode.

Finally, it will of course be mentioned that detection means 72 are arranged to provide input signals to supply means 70, and in particular, an input signal when the induced voltage in coil 23 crosses zero. Detection means 72 are not limited to the detection of zero crossings of the induced voltage (or induced current) in coil 23, but may also allow detection of other information relating to this induced voltage or induced current, as is in particular the case for missed steps.

What is claimed is:

1. An electromechanical transducer comprising a stator and first and second rotors controlled independently of each other and comprising respectively first and second bipolar permanent magnets having radial magnetisation, said stator defining first and second stator holes within which are respectively situated said first and second permanent magnets, wherein said stator comprises a first part defining first, second and third magnetic poles, said first and second magnetic poles entirely defining said first stator hole and said second and third magnetic poles entirely defining said second stator hole, said first, second and third magnetic poles being respectively connected to the first ends of first, second and third magnetic cores respectively bearing first, second and third independent coils, the second ends of said first, second and third magnetic cores being connected to a second part of the stator used for closing the magnetic circuits of said electromechanical transducer, and wherein said first and third coils are connected to supply means arranged for supplying said first and third coils so as to actuate respectively said first and second rotors and said second coil is connected to means for selectively detecting the rotation of said first and second rotors.

2. A transducer according to claim 1, wherein said first and second magnetic poles are magnetically insulated from each other by two first necks, said second and third magnetic poles being magnetically insulated from each other by two second necks, two first positioning notches being arranged on the edge of said first stator hole so as to define a minimum energy direction for the magnetic axis of said first permanent magnet, two second positioning notches being also arranged on the edge of said second stator hole so as to define a second minimum energy direction for the magnetic axis of said second permanent magnet.

3. A transducer according to claim 2, wherein said first necks define a first zero coupling direction between said first coil and said first permanent magnet when the magnetic axis of said first permanent magnet is aligned with said first direction, said second necks also defining a second zero coupling direction between said third coil and said second permanent magnet when the magnetic axis of said second permanent magnet is aligned with said second direction, said first and second zero coupling directions being respectively staggered at an angle which is not zero with said first and second minimum energy directions.

4. A transducer according to claim 1, wherein said first and second rotors are mechanically coupled to first and second coaxial wheels, arranged on either side of said first part of said stator.

5. A transducer according to claim 1, wherein said detection means are arranged for detecting each missed or faulty step of said first rotor or said second rotor selectively actuated in a stepping operating mode by said supply means which are arranged to allow said stepping operating mode for said first and second rotors.

6. A transducer according to claim 5, wherein said detection means are arranged for detecting zero crossings of the induced voltage in said second coil when said first and second rotors are selectively actuated in rapid or continuous operating mode by said supply means which are arranged to allow rapid or continuous operation of said first and second rotors, said detection means being electrically connected to said supply means to which they supply an input signal when said induced voltage crosses zero, said supply means being arranged to be able to reverse the polarity of the supply voltage when they receive one said input signal.

7. A transducer according to claim 1, wherein said detection means are arranged for detecting zero crossings of the induced voltage in said second coil when said first and second rotors are selectively actuated in rapid or continuous operating mode by said supply means which are arranged to allow rapid or continuous operation of said first and second rotors, said detection means being electrically connected to said supply means to which they supply an input signal when said induced voltage crosses zero, said supply means being arranged to be able to reverse the polarity of the supply voltage when they receive one said input signal.

8. A transducer according to claim 7, wherein said supply means are arranged to allow a rapid or continuous operating mode in both rotational directions of each of said first and second rotors.

9. A transducer according to claim 8, wherein, when a rapid or continuous operating mode in a forward direction is activated, the supply means are arranged so that the polarity of the induced voltage is reversed each time that one said input signal is received.

10. A transducer according to claim 9, wherein, when one of said first and second rotors is actuated in a rapid or continuous operating mode in a backward rotational direction, said input signals received during an initial period of time having a duration greater than the duration of a first pulse have no effect on the supply of the transducer, the last pulse supplied before the actuated rotors stops being of a greater duration than that of the pulse which precedes it.

11. A transducer according to claim 8, wherein, when one of said first and second rotors is actuated in a rapid or continuous operating mode in a backward rotational direction, said input signals received during an initial period of time having a duration greater than the duration of a first pulse have no effect on the supply of the transducer, the last pulse supplied before the actuated rotors stops being of a greater duration than that of the pulse which precedes it.

12. A transducer according to claim 11, wherein said last pulse is at least substantially twice as long as said pulse which precedes it.

13. A transducer according to claim 12, wherein, when the second coil is connected to said supply means, said second coil is electrically connected in parallel to said first coil when said first rotor is actuated in rotation, said third coil being then short-circuited, and to said third coil when said second rotor is actuated in rotation, said first coil being then short-circuited.

14. An electromechanical transducer comprising a stator and first and second rotors controlled independently of each other and comprising respectively first and second bipolar permanent magnets having radial magnetisation, said stator defining first and second stator holes within which are respectively situated said first and second permanent magnets, wherein said stator comprises a first part defining first, second and third magnetic poles, said first and second magnetic poles entirely defining said first stator hole and said second and third magnetic poles entirely defining said second stator hole, said first, second and third magnetic poles being respectively connected to the first ends of first, second and third magnetic cores respectively bearing first, second and third independent coils, the second ends of said first, second and third magnetic cores being connected to a second part of the stator used for closing the magnetic circuits of said electromechanical transducer, wherein said first and third coils are connected to supply means arranged for supplying said first and third coils so as to actuate respectively said first and second rotors, and wherein said second coil may be selectively connected to said supply means to receive a supply current or to means for detecting the rotation of said selectively actuated first rotor and second rotor.

15. A transducer according to claim 14, wherein, when said second coil is connected to said supply means, said second coil is electrically connected in series to said first coil when said first rotor is actuated in rotation, said third coil being then short-circuited, and to said third coil when said second rotor is actuated in rotation, said first coil being then short-circuited.

16. A transducer according to claim 14, wherein said supply means are arranged to allow a stepping operating mode and a rapid or continuous operating mode of said transducer, said second coil being connected to said supply means when a stepping operating mode is actuated and to said detection means when a rapid or continuous operating mode is activated.

17. A transducer according to claim 16, wherein, when a rapid or continuous operating mode is activated, said detection means are arranged to detect zero crossings of the induced voltage in said second coil when one or other of said first and second rotors is actuated, said detection means being electrically connected to said supply means to which they supply an input signal upon each zero crossing of said induced voltage, said supply means being arranged to be able to reverse the polarity of the supply voltage when they receive one said input signal.

18. A transducer according to claim 17, wherein said supply means are arranged to allow a rapid or continuous operating mode in both rotational directions of each of said first and second rotors.

19. A transducer according to claim 18, wherein, when a rapid or continuous operating mode in a forward direction is activated, the supply means are arranged so that the polarity of the supply voltage is reversed each time that one said input signal is received.

20. A transducer according to claim 18, wherein, when one of said first and second rotors is activated in rapid or continuous operating mode in a backward direction, said input signals received during an initial period of time having a duration greater than the duration of a first pulse have no effect on the supply of the transducer, the last pulse supplied before the actuated rotor stops being of a greater duration than that of the pulse which precedes it.

21. A transducer according to claim 20, wherein said last pulse is at least substantially twice as long as said pulse which precedes it.

* * * * *